(12) United States Patent
Kanna et al.

(10) Patent No.: US 12,220,688 B2
(45) Date of Patent: Feb. 11, 2025

(54) NANO SIZE CRYSTAL ZSM-5 AND ITS PREPARATION AND APPLICATIONS THEREOF

(71) Applicant: HINDUSTAN PETROLEUM CORPORATION LIMITED, Bangalore (IN)

(72) Inventors: Narasimharao Kanna, Bengaluru (IN); Suresh Kumar B, Bengaluru (IN); Hemant Mishra, Bengaluru (IN); Pramod Kumar, Bengaluru (IN)

(73) Assignee: HINDUSTAN PETROLEUM CORPORATION LIMITED

(*) Notice: Subject to any disclaimer, the term of this patent is extended or adjusted under 35 U.S.C. 154(b) by 112 days.

(21) Appl. No.: 18/192,727

(22) Filed: Mar. 30, 2023

(65) Prior Publication Data
US 2024/0253027 A1    Aug. 1, 2024

(30) Foreign Application Priority Data

Jan. 27, 2023    (IN) .............................. 202341005508

(51) Int. Cl.
*B01J 37/10*    (2006.01)
*B01J 29/40*    (2006.01)
(Continued)

(52) U.S. Cl.
CPC ............. *B01J 37/105* (2013.01); *B01J 29/40* (2013.01); *B01J 35/40* (2024.01); *B01J 35/615* (2024.01); *B01J 35/617* (2024.01); *B01J 35/633* (2024.01); *B01J 37/0009* (2013.01); *B01J 37/04* (2013.01); *B01J 37/088* (2013.01); *B01J 37/30* (2013.01);
(Continued)

(58) Field of Classification Search
CPC . B01J 37/105; B01J 29/40; B01J 35/40; B01J 35/615; B01J 35/617; B01J 35/633; B01J 37/0009; B01J 37/04; B01J 37/088; B01J 37/30; C10G 11/05; C10G 2300/1074; C10G 2400/02; C10G 2400/06; C01B 39/40
See application file for complete search history.

(56) References Cited

U.S. PATENT DOCUMENTS 9,757,716 B2    9/2017   Burton
10,081,552 B2   9/2018   Burton et al.
(Continued)

FOREIGN PATENT DOCUMENTS

CN         108793185 A    11/2018

OTHER PUBLICATIONS

Zhang et al (Phosphino-polycarboxylic acid modified inhibitor nanomaterial for oilfield scale control, transport and inhibitor return in formation media (Year: 2016).*
(Continued)

*Primary Examiner* — Randy Boyer
*Assistant Examiner* — Juan C Valencia
(74) *Attorney, Agent, or Firm* — CANTOR COLBURN LLP

(57) ABSTRACT

The present invention provides a novel, cost-effective and simple synthetic process for preparing a nano ZSM-5 catalyst which is further utilized in fluid catalytic cracking of feedstock oil containing organic compounds. The nano-ZSM-5 catalyst shows higher selectivity towards olefines and low selectivity towards LCO and bottoms.

11 Claims, 1 Drawing Sheet

Nano ZSM-5

Micron ZSM-5

(51) Int. Cl.
- *B01J 35/40* (2024.01)
- *B01J 35/61* (2024.01)
- *B01J 35/63* (2024.01)
- *B01J 37/00* (2006.01)
- *B01J 37/04* (2006.01)
- *B01J 37/08* (2006.01)
- *B01J 37/30* (2006.01)
- *C10G 11/05* (2006.01)

(52) U.S. Cl.
CPC ...... *C10G 11/05* (2013.01); *C10G 2300/1074* (2013.01); *C10G 2400/02* (2013.01); *C10G 2400/06* (2013.01)

(56) References Cited

U.S. PATENT DOCUMENTS

| | | | |
|---|---|---|---|
| 11,225,416 B2 | 1/2022 | Ding et al. | |
| 11,827,855 B1* | 11/2023 | Al-Herz | C10G 11/05 |
| 2021/0155490 A1* | 5/2021 | Ding | B01J 29/40 |

OTHER PUBLICATIONS

Malaie et al. "Crystal Growth Inhibition of Gypsum Under Normal Conditions and High Supersaturations by a Copolymer of Phosphino-Polycarboxylic Acid," Heliyon, (2021), 1-9.

* cited by examiner

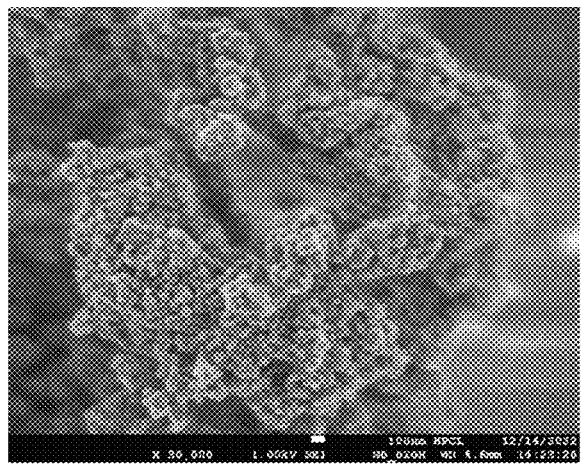 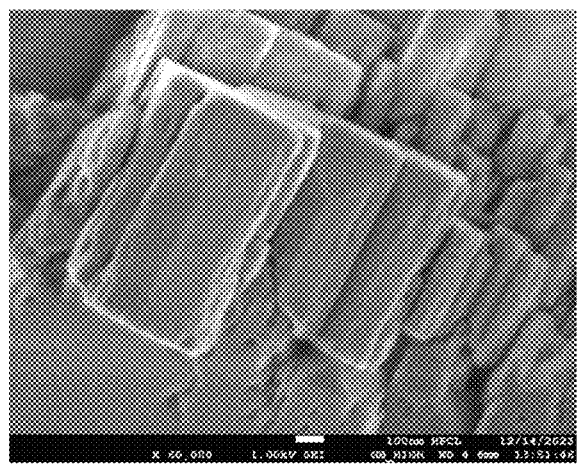
Nano ZSM-5        Micron ZSM-5

NANO SIZE CRYSTAL ZSM-5 AND ITS PREPARATION AND APPLICATIONS THEREOF

CROSS REFERENCE TO RELATED APPLICATION

This application claims the benefit of Indian Application No. 202341005508, filed Jan. 27, 2023, which is hereby incorporated by reference in its entirety.

FIELD OF THE INVENTION

The present invention relates to the field of zeolite catalyst for crude oil cracking. More particularly, the present invention relates to a novel synthesis of nano ZSM-5 zeolite catalyst and the application of nano ZSM-5 catalyst in fluid catalytic cracking (FCC) demonstrating higher olefine selectivity.

BACKGROUND OF THE INVENTION

Zeolites can act as cracking catalyst in petroleum industry because of its unique properties like uniform shape, topology, pore size and framework composition. One of the widely used zeolite is ZSM-5, due to its channel dimensions and intersections, thermal stability, acidity, shape-selectivity, and it is prominent as a leading candidate for light olefin maximization and gasoline octane enhancement. Activity of ZSM-5 mainly depends on type of acidity, crystal size, and crystal morphology or topology. Decreasing particle size from micron to nano size leads to substantial changes in the physical properties. Further, nano-sized zeolite offers a short diffusion path for hydrocarbon molecules which leads to lower aromatics, coke formation and high olefin selectivity.

Attempts have been made in the past to achieve the nanoscale dimensions of ZSM-5 catalyst such as U.S. Ser. No. 11/225,416B2 demonstrates the synthesis of well distributed nano—sized ZSM-5 zeolite using dry gel conversion technique, wherein the nano—sized ZSM-5 zeolite needs to be separated through ultracentrifugation technique. However, the common problem occurs in the isolation on nanocrystalline products is that their aggregates are so small that the product must be collected by centrifugation rather than by simple filtration techniques. Large scaleup is therefore difficult to process.

The problem is somehow addressed by U.S. Pat. No. 9,757,716B2 and U.S. Ser. No. 10/081,552B2 which also demonstrates the synthesis of nano ZSM-5 using certain bis (N pentylpyrrolidinium)—diquat—n cations, where n=4, 5 or 6, as a structure directing agent where they achieved ultra-small size ZSM-5 in some cases.

Similarly CN112645350A provides a method for synthesizing nano ZSM-5 zeolite, which involves the use of $[C]_{22}H_{45}$—$N_+(CH_3)_2$—$C_6H_{12}$—$N_+(CH_3)_2$—$C_6H_{13}]Br_2$ or ion exchange liquid $[C]_{22}H_{45}$—$N_+(CH_3)_2$—$C_6H_{12}$—$N_+(CH_3)_2$—$C_6H_{13}](OH)_2$ as a templet.

However, the complicated synthesis of structure controlling agents and use of complex templets makes the nano sized ZSM-5 synthesis process cumbersome.

Therefore, there is a need of simple, centrifuge free filtration and cost-effective synthesis of nano ZSM-5 catalyst which is free from complicated templets and structure controlling agents for it to be effectively utilized in various conversion and catalytic reactions.

SUMMARY OF THE INVENTION

This summary is provided to introduce a selection of concepts, in a simplified format, that are further described in the detailed description of the invention. This summary is neither intended to identify key or essential inventive concepts of the invention and nor is it intended to determine the scope of the invention.

The present invention discloses a novel synthesis methodology developed towards cost effective synthesis of nano ZSM-5 catalyst. The prepared nano ZSM-5 catalyst shows higher selectivity towards LPG, Propylene and lower LCO selectivity in ACE-MAT evaluation.

The present invention provides, a process for synthesising a nano ZSM-5 catalyst, comprising:
  (i) adding an aluminium precursor, a quaternary ammonium template and a size controlling agent in an aqueous basic solution in a hydrothermal reactor to obtain a first solution;
  (ii) adding a silica precursor to the first solution to obtain a second solution;
  (iii) stirring the second solution and then conducting aging to form a reaction mixture;
  (iv) heating the reaction mixture in the hydrothermal reactor followed by cooling, then filtering, washing, and drying to obtain a solid product; and
  (v) calcining the solid product to obtain a calcined product comprising the nano ZSM-5 catalyst, wherein the size controlling agent comprises phosphino carboxylic acid.

In an aspect the present invention provides, the process described above further comprising the step of conducting an ion exchange treatment of the calcined product to convert to $H^+$-form.

In an aspect the present invention provides, the aging of the solution is conducted at variable temperature and time and is performed in two steps comprising:
  (i) first step aging is conducted at a temperature in the range of 25 to 100° C. for 0.5 to 5 h; and
  (ii) second step aging is conducted at a temperature in the range of 35 to 120° C. for 0.5 to 8 hrs.

In an aspect the present invention provides, a nano ZSM-5 catalyst comprising of self-assembled ZSM-5 nanoparticles of size 25-250 nm wherein the BET surface area of nano ZSM-5 catalyst is 350-500 $m^2/g$ and micropore volume is 0.20-0.40 cc/g.

In an aspect the present invention provides, a process for fluid catalytic cracking of feedstock oil to a conversion product, the process comprising contacting the feedstock oil with a catalyst under fluid catalytic cracking condition to obtain the conversion product, wherein the catalyst comprising an equilibrium catalyst and a nano ZSM-5 additive formulation, wherein the nano ZSM-5 additive formulation is prepared by reacting the nano ZSM-5 as defined above with clay, colloidal silica and alumina.

In one aspect the present invention provides, the catalyst comprises of 90 to 99 wt. % of refinery-based FCC equilibrium catalyst and 10 to 1 wt. % of nano ZSM-5 additive formulation.

In another aspect the present invention provides, the ratio of catalyst to oil ratio is in the range of 4 to 6.

In another aspect the present invention provides, the feedstock oil is a vacuum gas oil comprising saturates, aromatics, resins, and asphaltenes.

In yet another aspect the present invention provides, the conversion product comprises dry gas (DG), liquefied petroleum gas (LPG), gasoline, heavy naphtha, light cycle naphtha, clarified oil and coke.

OBJECTIVES OF THE PRESENT INVENTION

The major objective of the present invention is to provide a novel, cost effective and simple synthesis method for nano ZSM-5 catalyst.

Another objective of the invention is to utilize the nano ZSM-5 catalyst in fluid catalytic cracking with high olefins selectivity.

BRIEF DESCRIPTION OF THE DRAWINGS

FIG. 1. SEM images of nano ZSM-5 and micron ZSM-5.

ABBREVIATIONS

ZSM-5—Zeolite Socony Mobil-5
FCC—Fluid catalytic cracking
LPG—Liquefied petroleum gas
LCO—Light cycle oil
ACE-MAT—Advanced Cracking Evaluation—Micro-Activity test

DETAILED DESCRIPTION OF THE INVENTION

For the purpose of promoting an understanding of the principles of the invention, reference will now be made to the embodiments in the specific language will be used to describe the same. It will nevertheless be understood that no limitation of the scope of the invention is thereby intended, such alterations and further modifications in the illustrated process, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The composition, methods, and examples provided herein are illustrative only and not intended to be limiting.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The terminology and structure employed herein is for describing, teaching, and illuminating some embodiments and their specific features and elements and does not limit, restrict, or reduce the spirit and scope of the invention.

The present invention provides a novel cost-effective process for synthesis of nano ZSM-5. The prepared nano ZSM-5 shows higher selectivity towards olefines such as propylene, LPG, and lower LCO selectivity in ACE-MAT evaluation. In a feedstock mixture of n-hexane, cycloalkanes, napthenes, and BTX, nano ZSM-5 catalyst have ~15% higher olefins selectivity, ~15% lower BTX selectivity and ~14% lower coke selectivity.

The present invention provides, a process for synthesising a nano ZSM-5 catalyst, comprising:
(i) adding an aluminium precursor, a quaternary ammonium template and a size controlling agent in an aqueous basic solution in a hydrothermal reactor to obtain a first solution;
(ii) adding a silica precursor to the first solution to obtain a second solution;
(iii) stirring the second solution and then conducting aging to form a reaction mixture;
(iv) heating the reaction mixture in the hydrothermal reactor followed by cooling, then filtering, washing and drying to obtain a solid product;
(v) calcining the solid product to obtain a calcined product comprising the nano ZSM-5 catalyst; and wherein the size controlling agent comprises phosphino carboxylic acid.

In one of the features of the present invention, the phosphino carboxylic acid in the second solution provides a unique combination having a ratio of elements as Si+Al/P in the range of 100-2500 moles.

In one of the features of the present invention, the process described above further comprising the step of conducting an ion exchange treatment of the calcined product to convert to $H^+$-form. In yet another feature of the present invention, the ion exchange treatment is done with ammonium salt to convert nano-ZSM-5 from $Na^+$ form to $NH_4^+$ form, wherein the ammonium salt is selected from ammonium sulfate, ammonium chloride, ammonium nitrate, and ammonium acetate. Prepared, we need to exchange the same.

In one of the features of the present invention, the aluminium precursor is selected form aluminium nitrate, aluminium sulfate, sodium aluminate, aluminium propoxide, and aluminium oxide.

In another feature of the present invention, the aqueous basic solution is prepared by dissolving base in water. The base is selected from NaOH and KOH.

In yet another feature of the present invention, the quaternary ammonium templet is tetrapropyl ammonium bromide, tetrapropyl ammonium hydroxide, and cetyl ammonium bromide.

In yet another feature of the present invention, the silica precursor is selected form Si-tetraethyl ortho silicate, colloidal silica, and sodium silicate.

In one of the features of the present invention, the aging of the second solution is conducted at variable temperature and time and is performed in two steps comprising:
(i) first step aging is conducted at a temperature in the range of 25 to 100° C. for 0.5 to 5 hrs; and
(ii) second step aging is conducted at a temperature in the range of 35 to 120° C. for 0.5 to 8 hrs.

In another feature of the present invention, the reaction mixture is heated in hydrothermal reactor at a temperature in a range of 140-190° C. for 12-56 hrs.

In yet another feature of the present invention, the entire reaction in the hydrothermal reactor is agitated at a speed in the range of 200-1000 rpm.

In yet another feature of the present invention, the calcination of the solid product is done at a temperature in the range of 500-600° C. for 2-6 hrs.

The present invention provides, a nano ZSM-5 catalyst comprising of self-assembled ZSM-5 nanoparticles of size 25-250 nm.

In another feature of the present invention, the BET surface area of nano ZSM-5 catalyst is 350-500 m$^2$/g and micropore volume is 0.20-0.40 cc/g.

The present invention also provides, a process for fluid catalytic cracking of feedstock oil to a conversion product, the process comprising contacting the feedstock oil with a catalyst under fluid catalytic cracking condition to obtain the conversion product, wherein the catalyst comprising an equilibrium catalyst and a nano ZSM-5 additive formulation, wherein the nano ZSM-5 additive formulation is prepared by reacting the nano ZSM-5 as defined above with clay, colloidal silica and alumina.

In one feature of the present invention, the catalyst comprises of 90 to 99 wt. % of refinery-based FCC equilibrium catalyst and 10 to 1 wt. % of nano ZSM-5 additive formulation.

In another feature of the present invention, the ratio of catalyst to oil ratio is in the range of 4 to 6.

In another feature of the present invention, the feedstock oil is a vacuum gas oil comprising saturates, aromatics, resins, and asphaltenes.

In yet another feature of the present invention, the conversion product comprises dry gas (DG), liquefied petroleum gas (LPG), gasoline, heavy naphtha, light cycle naphtha, clarified oil and coke.

EXAMPLES

The present disclosure with reference to the accompanying examples describes the present invention. However, those of skill in the art should, in light of the present disclosure, appreciate that many changes can be made in the specific embodiments which are disclosed and still obtain a like or similar result without departing from the spirit and scope of the invention. It is understood that the examples are provided for the purpose of illustrating the invention only and are not intended to limit the scope of the invention in any way.

Example 1: Nano ZSM-5

In a 1 Littre PARR reactor, approximately 16 g of NaOH is dissolved in 300 g water. To this solution, 20 g of aluminium precursor is added and stirred for 10 min followed by addition of 25 g of quaternary ammonium template and 0.25 g of phosphino carboxylic acid. Followed by addition of 120 g of silica precursor. The complete solution is stirred and aged at 60° C. for 2 h, and then aged at 100° C. for 6 h and later entire solution is hydrothermally treated at 170° C. for 2 days. After completion of reaction time, stop the reactor heating and allow the reactor to natural cooling. Speed of agitation in PARR for entire experiment is 550 rpm. After the synthesis, filter the solution through whatmann filter paper and wash with copious amount of water, dried and powdered. Calcine the entire powder at 550° C. for 4 hours to remove all the templates and other impurities. The material is ion exchanged with ammonium salt to convert to H$^+$-form. SEM image of nano ZSM-5 is shown in FIG. 1. The physico-chemical properties of the nano-ZSM-5 is given in Table 1.

Example 2: Nano ZSM-5

In a 1 Littre PARR reactor, approximately 16 g of NaOH is dissolved in 300 g water. To this solution, 20 g of aluminium precursor is added and stirred for 10 min followed by addition of 25 g of quaternary ammonium template and 0.50 g of phosphino carboxylic acid. Followed by addition of 120 g of silica precursor. The complete solution is stirred and aged at 60° ° C. for 2 h, and then aged at 100° C. for 6 h and later entire solution is hydrothermally treated at 170° C. for 2 days. After completion of reaction time, stop the reactor heating and allow the reactor to natural cooling. Speed of agitation in PARR for entire experiment is 550 rpm. After the synthesis, filter the solution through whatmann filter paper and wash with copious amount of water, dried and powdered. Calcine the entire powder at 550° C. for 4 hours to remove all the templates and other impurities. The material is ion exchanged with ammonium salt to convert to H$^+$-form. The physico-chemical properties of the nano-ZSM-5 is given in Table 1.

Example 3: Micron ZSM-5

Micron ZSM-5 is prepared through similar synthesis method as described in example 1, except the size controlling agent phosphino carboxylic acid is not added into the reaction mixture and without aging steps.

SEM image of micron ZSM-5 is shown in FIG. 1. The physico-chemical properties of the micron ZSM-5 is given in Table 1.

TABLE 1

Physico-chemical properties of as-synthesized Nano ZSM-5 and micron ZSM-5

| Properties | Nano ZSM-5 (As per Example-1) | Nano ZSM-5 (As per Example-2) | Micron ZSM-5 (As per Example-3) |
|---|---|---|---|
| BET surface area (m$^2$/g) | 440 | 425 | 385 |
| External surface area (m$^2$/g) | 253 | 243 | 124 |
| Micropore surface area (m$^2$/g) | 187 | 182 | 261 |
| Micropore volume (cc/g) | 0.30 | 0.29 | 0.24 |
| Total acidity (μmol/g) | 903 | 890 | 726 |
| Crystallinity (from PXRD) | 96% | 96% | 100% |

Example 4: Nano ZSM-5 Additive Preparation

Nano ZSM-5 additive formulation is prepared by using nanocrystalline ZSM-5 of example 1 or 2, clay, colloidal silica and alumina in spray dryer.

Example 5: Micron Size ZSM-5 Additive Preparation

Micron ZSM-5 additive formulation is prepared by using Micron ZSM-5, clay, colloidal silica and alumina in spray dryer.

Example 6: Pre-Treatment of Nano ZSM-5 Additive by Hydrothermal Deactivation Method In order to maintain the desired level of conversion (feed to useful products such as dry gas (DG), liquefied petroleum gas (LPG), gasoline, heavy naphtha, light cycle naphtha, clarified oil and coke) in the FCC unit, an equilibrium catalyst and along with ZSM-5 additive ("E-CAT") is continuously removed from the regenerator and added with a fresh catalyst. Accurate prediction of catalyst deactivation rate which happens in the commercial units under real operating conditions in the laboratory is essential not only to the catalyst management strategy but also to the evaluation process and selection of catalysts. Catalyst deactivation of lab developed additives were carried out at 815° C. for 5 hours with 80% steaming recipe in Metal Cyclic Deactivation unit before performance evaluation.

Feedstock Characterization

The feed used in the present study is vacuum gas oil (VGO) and its properties are listed in below table 2.

TABLE 2

| Vacuum Gas Oil Feed Properties | |
| --- | --- |
| Properties | VGO |
| Density at 15° C., gm/cc | 0.9171 |
| Sulphur, wt % | 1.969 |
| CCR, wt % | 0.6 |
| Pour point, ° C. | 45 |
| Kinematic viscosity @100° C., cSt | 7.742 |
| ASTM-7169 Distillation, wt % | |
| IBP | 283 |
| 5 | 345 |
| 10 | 365 |
| 30 | 404 |
| 50 | 429 |
| 70 | 457 |
| 90 | 506 |
| 95 | 529 |
| SARA, wt % | |
| Saturates | 57.1 |
| Aromatics | 33.3 |
| Resin | 9.4 |
| Asphaltenes | 0.2 |

Example 7: Performance Evaluation Results

Advanced Cracking Evaluation (ACE)—Micro-Activity test (MAT) unit (with online RGA) was used to measure the micro-activity of steam deactivated nano ZSM-5 and micron ZSM-5 additive with reference catalyst to get their relative activity/selectivity. The results show conversion and product yields at par with the reference additive as shown in below table 3. The product yields are compared with the reference catalyst, and it was observed the nano ZSM-5 additive showed higher conversion, LPG and propylene selectivity.

The detailed results are given in table 3.

TABLE 3

| | Product yields | | | |
| --- | --- | --- | --- | --- |
| Catalyst Name | E-CAT (96%) + Micron ZSM-5 additive (4%) | E-CAT (96%) + Nano ZSM-5 additive (4%) | E-CAT (96%) + Micron ZSM-5 additive (4%) | E-CAT (96%) + Nano ZSM-5 additive (4%) |
| Cracking Temperature, ° C. | 529.0 | 529.0 | 529.0 | 529.0 |
| Cat/oil ratio | 4 | | 6 | |
| Conv., wt % | 61.75 | 64.69 | 65.06 | 66.05 |
| Yield (wt. %) | | | | |
| Coke | 3.017 | 3.055 | 3.555 | 3.861 |
| Dry Gas | 2.682 | 3.061 | 2.906 | 3.179 |
| LPG | 16.946 | 18.221 | 16.520 | 20.506 |
| Ethylene | 0.819 | 1.078 | 0.940 | 1.131 |
| Propylene | 5.829 | 6.747 | 6.240 | 7.252 |
| C4 Olefins | 4.754 | 5.332 | 4.880 | 6.246 |
| Gasoline | 39.104 | 40.352 | 42.074 | 38.504 |
| LCO | 20.942 | 19.309 | 19.625 | 18.861 |
| Bottoms | 17.309 | 16.001 | 15.319 | 15.089 |

Advantages of the Invention

Nano size ZSM-5 synthesis requires expensive centrifugation step in commercial scale. The present invention provides a protocol to develop nano ZSM-5 zeolite in an ensemble fashion and requires only simple filtration instead of centrifugation.

Nano ZSM-5 synthesized through the developed protocol, produces higher propylene yield and minimizes bottoms and LCO in Fluid catalytic cracking unit in refinery.

The nano ZSM-5 as developed in the present invention opens the scope of application in fluid catalytic cracking catalyst, petrochemical catalyst, biomass to chemicals catalysts.

We claim:

1. A process for synthesizing a nano ZSM-5 catalyst, the process comprising:
   (i) adding an aluminum precursor, a quaternary ammonium template and a size controlling agent in an aqueous basic solution in a hydrothermal reactor to obtain a first solution;
   (ii) adding a silica precursor to the first solution to obtain a second solution;
   (iii) stirring the second solution and then conducting aging to form a reaction mixture;
   (iv) heating the reaction mixture in the hydrothermal reactor followed by cooling, then filtering, washing and drying to obtain a solid product; and
   (v) calcining the solid product to obtain a calcined product comprising the nano ZSM-5 catalyst,
   wherein the size controlling agent comprises phosphino carboxylic acid.

2. The process as claimed in claim 1 further comprising the step of conducting an ion exchange treatment of the calcined product to convert to $H^+$-form.

3. The process as claimed in claim 1, wherein the aluminium precursor is selected form aluminium nitrate, aluminium sulfate, sodium aluminate, aluminium propoxide, and aluminium oxide.

4. The process as claimed in claim 1, wherein the wherein the quaternary ammonium templet is selected from tetrapropyl ammonium bromide, tetrapropyl ammonium hydroxide, and cetyl ammonium bromide.

5. The process as claimed in claim 1, wherein the silica precursor is selected form Si-tetraethyl ortho silicate, colloidal silica, and sodium silicate.

6. The process as claimed in claim 1, wherein the aging of the second solution is conducted at variable temperature and time and is performed in two steps comprising:
   (i) first step aging is conducted at a temperature in the range of 25 to 100° C. for 0.5 to 5 hrs; and
   (ii) second step aging is conducted at a temperature in the range of 35 to 120° C. for 0.5 to 8 hrs.

7. The process as claimed in claim 1, wherein the reaction mixture is heated in hydrothermal reactor at a temperature in a range of 140-190° C. for 12-56 hrs.

8. The process as claimed in claim 1, wherein the calcination of the solid product is done at a temperature in the range of 500-600° C. for 2-6 hrs.

9. The process as claimed in claim 2, wherein the ion exchange treatment is done with ammonium salt, wherein the ammonium salt is selected from ammonium sulfate, ammonium chloride, ammonium nitrate, and ammonium acetate.

10. A process for fluid catalytic cracking of feedstock oil to a conversion product, the process comprising contacting the feedstock oil with a catalyst under fluid catalytic cracking condition to obtain the conversion product, wherein the catalyst comprising an equilibrium catalyst and a nano ZSM-5 additive formulation; and
    wherein the nano ZSM-5 additive formulation is prepared by reacting the nano ZSM-5 catalyst obtained according to the process of claim 1, with clay, colloidal silica and alumina.

11. The process as claimed in claim 10, wherein the feedstock oil is a vacuum gas oil comprising saturates, aromatics, resins, and asphaltenes,
    wherein the catalyst comprises 90 to 99 wt. % of refinery-based FCC equilibrium catalyst and 10 to 1 wt. % of nano ZSM-5 additive formulation;
    wherein the catalyst to oil ratio is in the range of 4 to 6; and
    wherein the conversion product comprises dry gas (DG), liquefied petroleum gas (LPG), gasoline, heavy naphtha, light cycle naphtha, clarified oil and coke.

* * * * *